United States Patent
Umnov et al.

(12) 
(10) Patent No.: US 6,509,095 B1
(45) Date of Patent: Jan. 21, 2003

(54) MULTI-LAYER FULLERENES AND METHOD OF MANUFACTURING SAME

(75) Inventors: Alexander G. Umnov, Kawasaki (JP); Vladimir Z. Mordkovich, Kawasaki (JP); Takeshi Inoshita, Kawasaki (JP)

(73) Assignee: International Center for Materials Research, Kawasaki (JP)

( * ) Notice: Subject to any disclaimer, the term of this patent is extended or adjusted under 35 U.S.C. 154(b) by 63 days.

(21) Appl. No.: 09/686,876

(22) Filed: Oct. 12, 2000

(51) Int. Cl.$^7$ .................................................. B32B 9/07
(52) U.S. Cl. ................ 428/408; 423/445 B; 427/249.1; 427/228; 427/577
(58) Field of Search .................... 428/408; 423/445 B; 427/249.1, 577, 228

(56) References Cited

FOREIGN PATENT DOCUMENTS

| JP | 11-092124 | * | 4/1999 |
| JP | 200024967 | * | 9/2000 |

* cited by examiner

*Primary Examiner*—Archene Turner
(74) *Attorney, Agent, or Firm*—Oblon, Spivak, McClelland, Maier & Neustadt, P.C.

(57) ABSTRACT

Multi-layer fullerenes with a novel structure which are expected to be applied to various fields, and a method of manufacturing the multi-layer fullerenes. The method comprises heating carbon-containing substances at a temperature of 2300° C. or higher in the presence of a $C_{60}$ fullerene to obtain novel multi-layer fullerenes which include a first multi-layer fullerene having a $C_{60}$ fullerene enclosed in a $C_{240}$ fullerene ($C_{60}@C_{240}$), a second multi-layer fullerene having a $C_{240}$ fullerene enclosed in a $C_{560}$ fullerene ($C_{240}@C_{560}$), and a third multi-layer fullerene having a $C_{80}$ fullerene enclosed in a $C_{240}$ fullerene which is enclosed in a $C_{560}$ fullerene ($C_{80}@C_{240}@C_{560}$).

10 Claims, 2 Drawing Sheets

MULTI-LAYER FULLERENES AND METHOD OF MANUFACTURING SAME

BACKGROUND OF THE INVENTION

1. Field of the Invention

The present invention relates to multi-layer fullerenes and a method of manufacturing the same. More particularly, the present invention relates to multi-layer fullerenes having a cage-inside-cage structure in which fullerenes having different carbon numbers are nested, and a method of manufacturing the multi-layer fullerenes.

2. Description of Background Art

A $C_{60}$ fullerene was discovered in 1985. A $C_{60}$ fullerene is a carbon cluster having a molecular structure shaped like a soccer ball. Since then, many studies have been conducted on carbon compounds having a polyhedral structure, and various types of fullerene compounds have been discovered.

Fullerene compounds are spherical carbon compounds containing only carbons. Higher fullerenes such as a $C_{60}$ fullerene having 60 carbon atoms and fullerenes having an even carbon number of more than 60 are collectively called fullerene compounds. Examples of such higher fullerenes include a $C_{70}$ fullerene, $C_{80}$ fullerene, $C_{120}$ fullerene, and the like. A $C_{180}$ fullerene, $C_{240}$ fullerene, $C_{560}$ fullerene, or the like is considered to exist in theory.

Application of such fullerene compounds has been studied. For example, substances in which a $C_{60}$ fullerene is doped with an alkaline metal have attracted attention as a new functional material because of their superconductivity. In particular, application of such substances to electronic materials has been extensively studied.

Conventionally, fullerene compounds are manufactured using a laser vaporization method or arc discharge method. In the laser vaporization method, for example, a gas flow containing a carbon source such as hydrocarbons and a photosensitizer is irradiated using a strong laser beam. This causes the carbon source to thermally decompose to produce black amorphous soot as a reaction product. Xiang-Xin Bi, P. C. Eklund, et al. have reported that spherical amorphous nanoparticles with an average particle diameter of 300 Å were found in a pyrolyzed product of benzene obtained using an iron carbonyl as a catalyst (J. Maste. Res., 10, 2875 (1995)). J. V. Weber et al. have reported that a fullerene compound having a small carbon number is reconstructed into a fullerene compound having a large carbon number by heating soot produced using an arc discharge method at a high temperature (J. Anal. Appl. Pyrolysis, 29, 1 (1994)). However, details of the reaction mechanism are unknown at present.

Accordingly, an object of the present invention is to provide multi-layer fullerenes with a novel structure which has unknown characteristics in addition to those of conventional fullerene compounds and are expected to be applied to various fields, and a method of manufacturing the multi-layer fullerenes.

SUMMARY OF THE INVENTION

As a result of extensive studies to achieve the above objects, the present inventors have found that fullerenes having different carbon numbers can be obtained by heating a carbon-containing substance at a temperature of 2300° C. or higher in the presence of a $C_{60}$ fullerene. This finding has led to the completion of the present invention.

Specifically, the present invention provides the following multi-layer fullerene and a method of manufacturing the multi-layer fullerenes.

(1) A multi-layer fullerene comprising a $C_{60}$ fullerene enclosed in a $C_{240}$ fullerene.

(2) A multi-layer fullerene comprising a $C_{240}$ fullerene enclosed in a $C_{560}$ fullerene.

(3) A multi-layer fullerene comprising a $C_{80}$ fullerene enclosed in a $C_{240}$ fullerene which is enclosed in a $C_{560}$ fullerene.

(4) A substance comprising at least one of the multi-layer fullereness according to the above (1) to (3).

(5) A method of manufacturing a multi-layer fullerene comprising heating carbon-containing substances at a temperature of 2300° C. or higher in the presence of a $C_{60}$ fullerene.

DETAILED DESCRIPTION OF THE INVENTION AND PREFERRED EMBODIMENT

Figure 1:
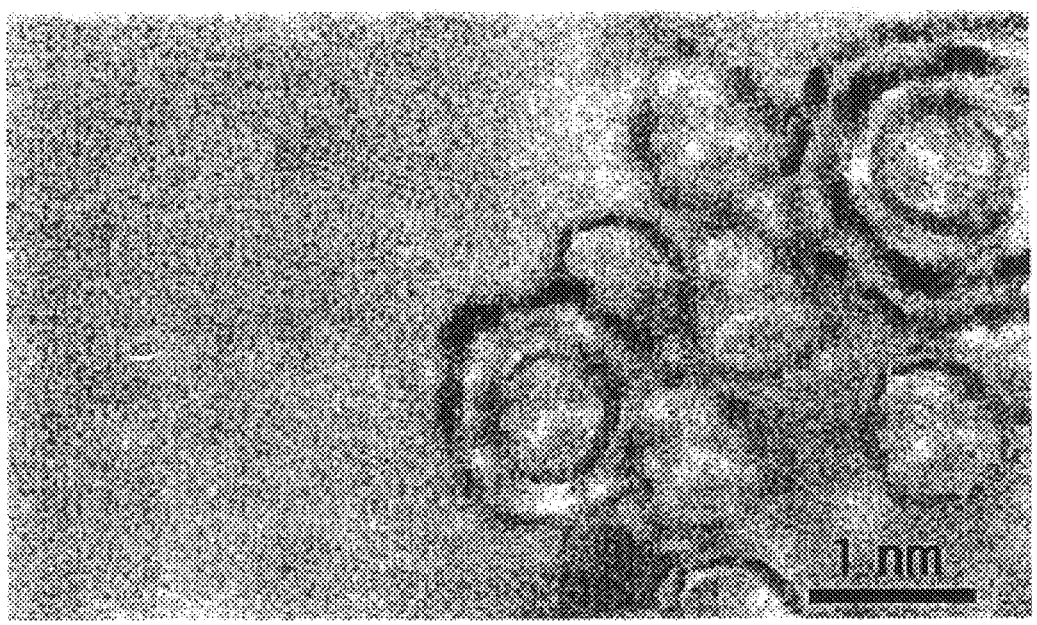
FIG. 1 is a photograph of a thin film of a sublimate obtained in an Example of the present invention photographed using transmission electron microscopy (TEM).

Multi-layer fullerenes and a method of manufacturing the multi-layer fullerenes according to the present invention will be described in more detail.

The multi-layer fullerenes of the present invention include a first multi-layer fullerene comprising a $C_{60}$ fullerene enclosed in a $C_{240}$ fullerene ($C_{60}@C_{240}$), a second multi-layer fullerene comprising a $C_{240}$ fullerene enclosed in a $C_{560}$ fullerene ($C_{240}@C_{560}$), and a third multi-layer fullerene comprising a $C_{80}$ fullerene enclosed in a $C_{240}$ fullerene which is enclosed in a $C_{560}$ fullerene ($C_{80}@C_{240}@C_{560}$).

The first to third multi-layer fullerenes are obtained by heating a carbon-containing substance at a temperature of 2300° C. or higher in the presence of a $C_{60}$ fullerene.

There are no specific limitations to the carbon-containing substance used as a carbon source. For example, hydrocarbons, graphite, carbon black, and the like can be used.

As the carbon-containing substance, a $C_{60}$ fullerene or a substance comprising a $C_{60}$ fullerene may be used.

As a method of heating the carbon-containing substance at a temperature of 2300° C. or higher, and preferably 2400° C. or higher, for example, a method of heating using a crucible, a laser vaporization method consisting of irradiating the carbon-containing substance using a laser, an arc discharge method consisting of applying an arc to the carbon-containing substance, or the like may be employed without specific limitations.

The method of heating using a crucible can be carried out by, for example, heating a carbon material containing a $C_{60}$ fullerene in a crucible at a temperature of 2300° C. or higher, and preferably 2400° C. or higher, for preferably 10–120 minutes in an argon atmosphere in an electric furnace, cooling the resulting product, and subliming the product under vacuum (preferably $1\times10^{-5}$ Torr or less) to purify the product.

The sublimate thus obtained contains the first to third multi-layer fullerenes.

The first to third multi-layer fullerenes can be isolated by injecting the sublimate dissolved in toluene, chloroform, or the like into a high performance liquid chromatograph (HPLC) using silica, alumina, or the like as a carrier.

The structure of the first to third multi-layer fullerenes is determined using transmission electron microscopy (TEM).

The first to third multi-layer fullerenes have molecules greater than other fullerenes which have been found and have a structure in which fullerenes having different carbon numbers are nested. Therefore, these fullerenes are expected to have unknown characteristics such as excellent sphericality (being almost accurately spherical) and superior strength, in addition to characteristics of known fullerene compounds, and to be applied to various fields.

Specifically, the first to third multi-layer fullerenes of the present invention are expected to have unknown characteristics (new functions) while maintaining the characteristics of a $C_{60}$ fullerene, such as gas occlusion characteristics, superconductivity, magnetic characteristics, photoelectrical effects, rectification characteristics, photosensitivity, lubricity, catalytic effects, and physiological activities.

EXAMPLES

The present invention will be described in more detail by examples, which should not be construed as limiting the present invention.

Example 1

Figure 2:
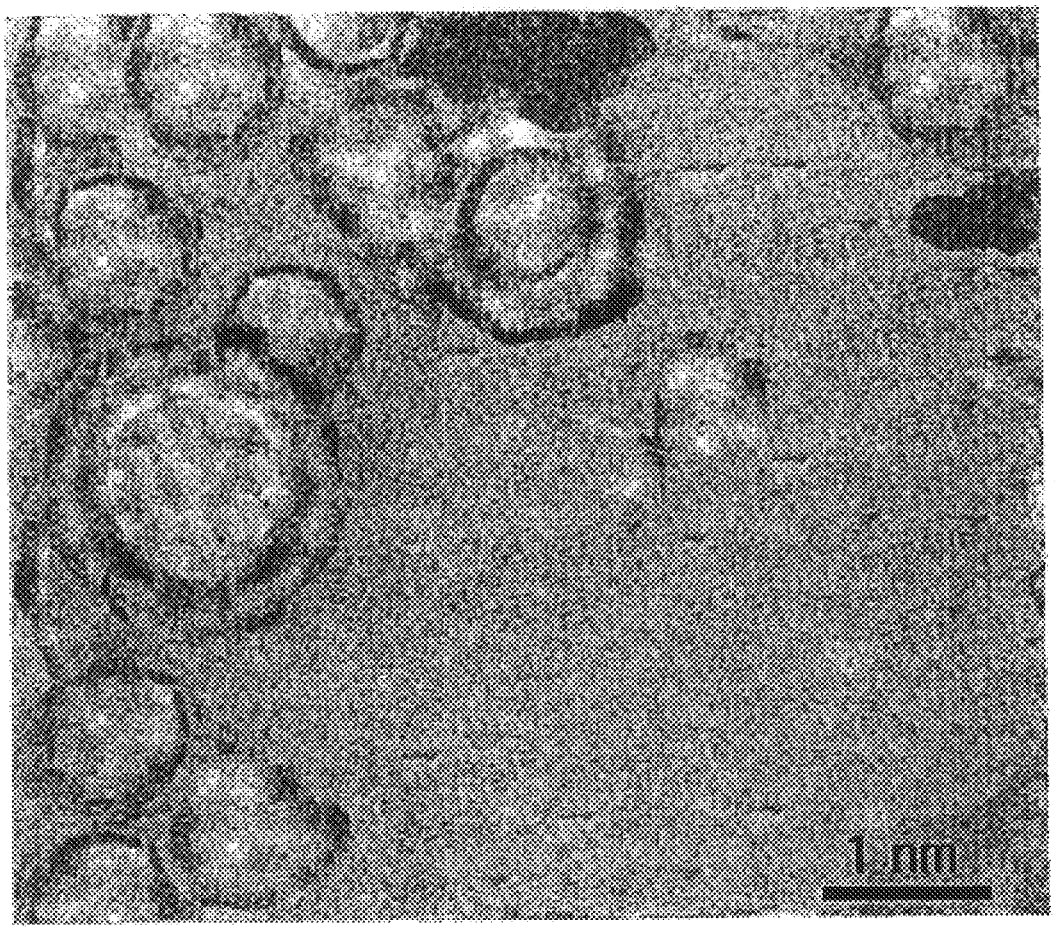
FIG. 2 is another photograph of a thin film of a sublimate obtained in an Example of the present invention photographed using transmission electron microscopy (TEM).

A crucible made of graphite was charged with 0.25 g of a carbon compound obtained by pyrolysis of benzene by irradiation using a laser, and was then lidded. The crucible was placed in a furnace and heated at 3000 °C. for one hour in an argon atmosphere at ordinary pressure. After cooling to room temperature, the resulting powder was sublimed at 1600° C. and $1\times10^{-6}$ Torr. The resulting sublimate was caused to accumulate on a glass substrate to obtain a brown thin film with a thickness of 500 nm. The presence of multi-layer fullerenes in the thin film was confirmed by TEM photographs. FIGS. 1 and 2 show the TEM photographs of the thin film.

FIG. 1 shows a two-layer fullerene with a diameter of 14 Å and a three-layer fullerene with a diameter of 20 Å which are present with amorphous $C_{80}$ fullerenes. FIG. 2 shows two-layer fullerenes with a diameter of 14 Å and 20 Å, respectively, which are present with amorphous $C_{80}$ fullerenes. The molecular weight of these fullerenes is calculated from their diameters. As a result of calculation, it was found that the two-layer fullerene with a diameter of 14 Å was composed of a $C_{60}$ fullerene enclosed in a $C_{240}$ fullerene ($C_{60}@C_{240}$), the three-layer fullerene with a diameter of 20 Å was composed of a $C_{80}$ fullerene enclosed in a $C_{240}$ fullerene which is enclosed in a $C_{560}$ fullerene ($C_{80}@C_{240}@C_{560}$), and the two-layer fullerene with a diameter of 20 Å was composed of a $C_{240}$ fullerene enclosed in a $C_{560}$ fullerene ($C_{240}@C_{560}$).

These three types of fullerenes were isolated by injecting the thin film dissolved in a solvent into a high performance liquid chromatograph with a column packed with alumina using toluene as a solvent. The overall yield of these fullerenes based on the thin film was 2%.

Example 2

A crucible made of graphite was charged with 1 g of a carbon compound obtained by pyrolysis of benzene by irradiation using a laser, and was then lidded. The crucible was placed in a furnace and heated at 2500° C. for 40 minutes in an argon atmosphere at ordinary pressure. After cooling to room temperature, the resulting powder was extracted with toluene using a Soxhlet extractor.

The resulting solution was isolated using a high performance liquid chromatograph (packing: alumina) to obtain a two-layer fullerene ($C_{60}@C_{240}$), a three-layer fullerene ($C_{80}@C_{240}@C_{560}$), and a two-layer fullerene ($C_{240}@C_{560}$), 0.5 mg each.

Example 3

A carbon target was pulse-irradiated using a KrF excimer laser (1 J/cm$^2$, 5 Hz). The product evaporated by irradiation was led to a $C_{60}$ fullerene substrate heated at 300° C. which was placed 40 mm away from the target, and was allowed to react. The presence of multi-layer fullerenes in a thin film formed on the substrate was confirmed using TEM.

As described above, the present invention can provide multi-layer fullerenes with a novel structure which have unknown characteristics in addition to those of conventional fullerene compounds and are expected to be applied to various fields, and a method of manufacturing the multi-layer fullerenes.

Obviously, numerous modifications and variations of the present invention are possible in light of the above teachings. It is therefore to be understood that, within the scope of the appended claims, the invention may be practiced otherwise than as specifically described herein.

What is claimed is:

1. A multi-layer fullerene comprising a $C_{60}$ fullerene enclosed in a $C_{240}$ fullerene.

2. A substance comprising at least a multi-layer fullerene according to claim 1.

3. A multi-layer fullerene comprising a $C_{240}$ fullerene enclosed in a $C_{560}$ fullerene.

4. A substance comprising at least a multi-layer fullerene according to claim 3.

5. A multi-layer fullerene comprising a $C_{80}$ fullerene enclosed in a $C_{240}$ fullerene which is enclosed in a $C_{560}$ fullerene.

6. A substance comprising at least a multi-layer fullerene according to claim 2.

7. A method of manufacturing a multi-layer fullerene comprising heating carbon-containing substances at a temperature of 2300° C. or higher in the presence of a $C_{60}$ fullerene.

8. A multi-layer fullerene comprising a $C_{60}$ fullerene enclosed in a $C_{240}$ fullerene, obtained by a method comprising heating a carbon-containing substance at a temperature of 2300° C. or higher in the presence of a $C_{60}$ fullerene.

9. A multi-layer fullerene comprising a $C_{240}$ fullerene enclosed in a $C_{560}$ fullerene, obtained by a method comprising heating a carbon-containing substance at a temperature of 2300° C. or higher in the presence of a $C_{60}$ fullerene.

10. A multi-layer fullerene comprising a $C_{80}$ fullerene enclosed in a $C_{240}$ fullerene which is enclosed in a $C_{560}$ fullerene, obtained by a method comprising heating a carbon-containing substance at a temperature of 2300° C. or higher in the presence of a $C_{60}$ fullerene.

* * * * *

UNITED STATES PATENT AND TRADEMARK OFFICE
CERTIFICATE OF CORRECTION

PATENT NO.    : 6,509,095 B1
DATED         : January 21, 2003
INVENTOR(S)   : Umnov et al.

It is certified that error appears in the above-identified patent and that said Letters Patent is hereby corrected as shown below:

<u>Title page,</u>
Item [30], Foreign Application Priority Data, should read:

-- [30]     Foreign Application Priority Data
        Dec. 2, 1999  (JP) ............................. 11-342705 --

Signed and Sealed this

First Day of July, 2003

JAMES E. ROGAN
*Director of the United States Patent and Trademark Office*